United States Patent [19]
Rheinfrank, Jr.

[11] 3,777,909
[45] Dec. 11, 1973

[54] APPARATUS FOR LOADING HOTMIX IN A SURGE BIN

[75] Inventor: Lamson Rheinfrank, Jr., Kansas City, Mo.

[73] Assignee: Standard Havens Systems Inc., Glasgow, Mo.

[22] Filed: Mar. 11, 1970

[21] Appl. No.: 18,651

[52] U.S. Cl............................................ 214/17 C
[51] Int. Cl............................................ B65g 65/32
[58] Field of Search............ 214/17 R, 17 C, 17 CB; 222/503

[56] References Cited
UNITED STATES PATENTS

| | | | |
|---|---|---|---|
| 3,305,138 | 2/1967 | Plumb | 214/17 C X |
| 3,182,859 | 5/1965 | Harris et al. | 214/17 C X |
| 2,739,797 | 3/1956 | Kemper | 222/503 X |
| 3,378,171 | 4/1968 | Eaton | 214/17 R X |
| 3,438,520 | 4/1969 | Williams | 214/17 C X |

Primary Examiner—Robert G. Sheridan
Attorney—Lowe, Kokjer, Kircher, Wharton and Bowman

[57] ABSTRACT

Hotmix is continuously delivered by conveyor to the top of a surge bin, and is intermittently held back from dropping into the bin by a pulse feeder which continuously receives the hotmix and pulsingly discharges the hotmix to the surge bin. The feeder includes an open topped container with a central discharge opening which is intermittently opened and closed by pneumatically activated clam gates.

1 Claim, 6 Drawing Figures

PATENTED DEC 11 1973　　3,777,909
SHEET 1 OF 2
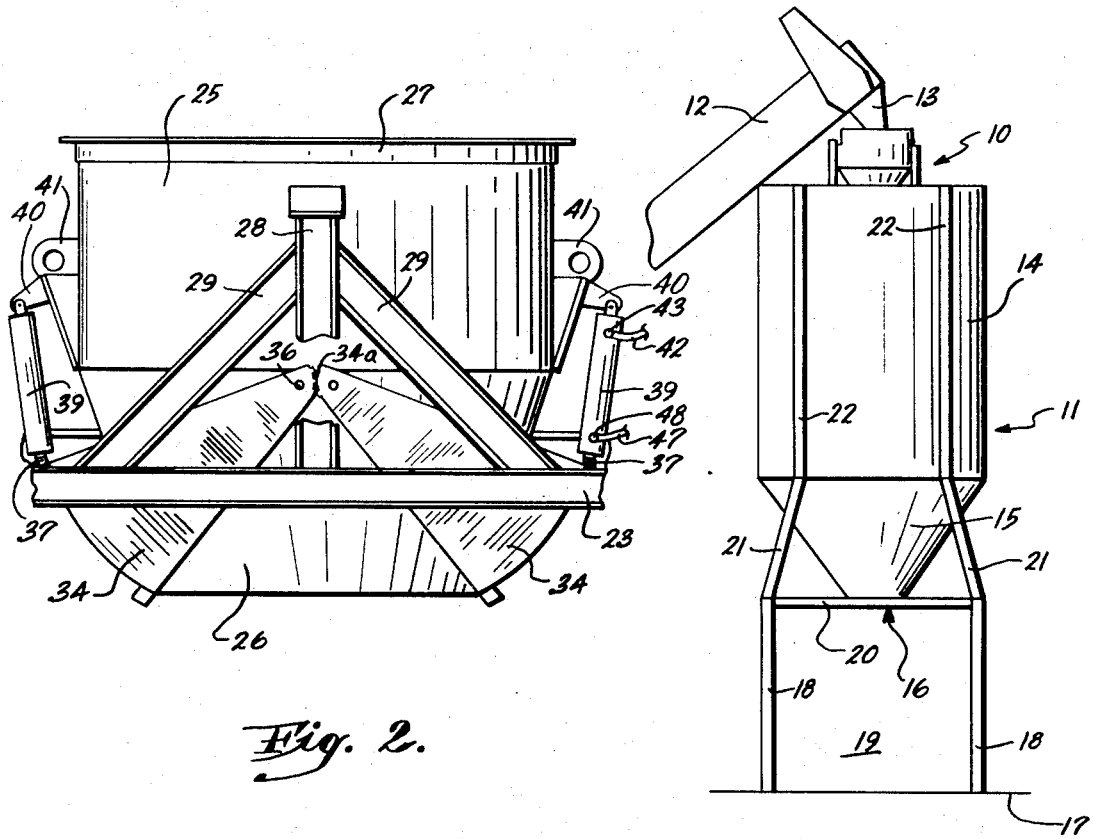
Fig. 2.
Fig. 1.
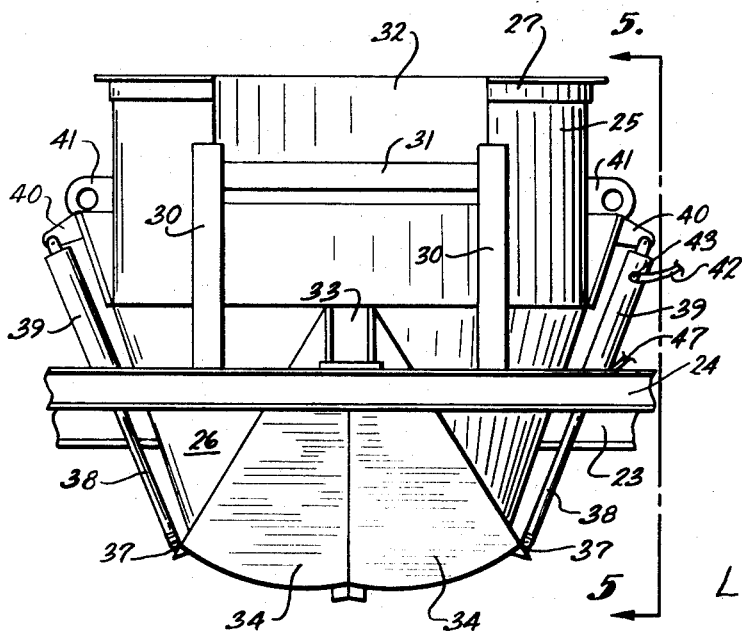
Fig. 3.
INVENTOR.
Lamson Rheinfrank, Jr.
BY
Scofield, Lyon, Scofield & Lowe
ATTORNEYS

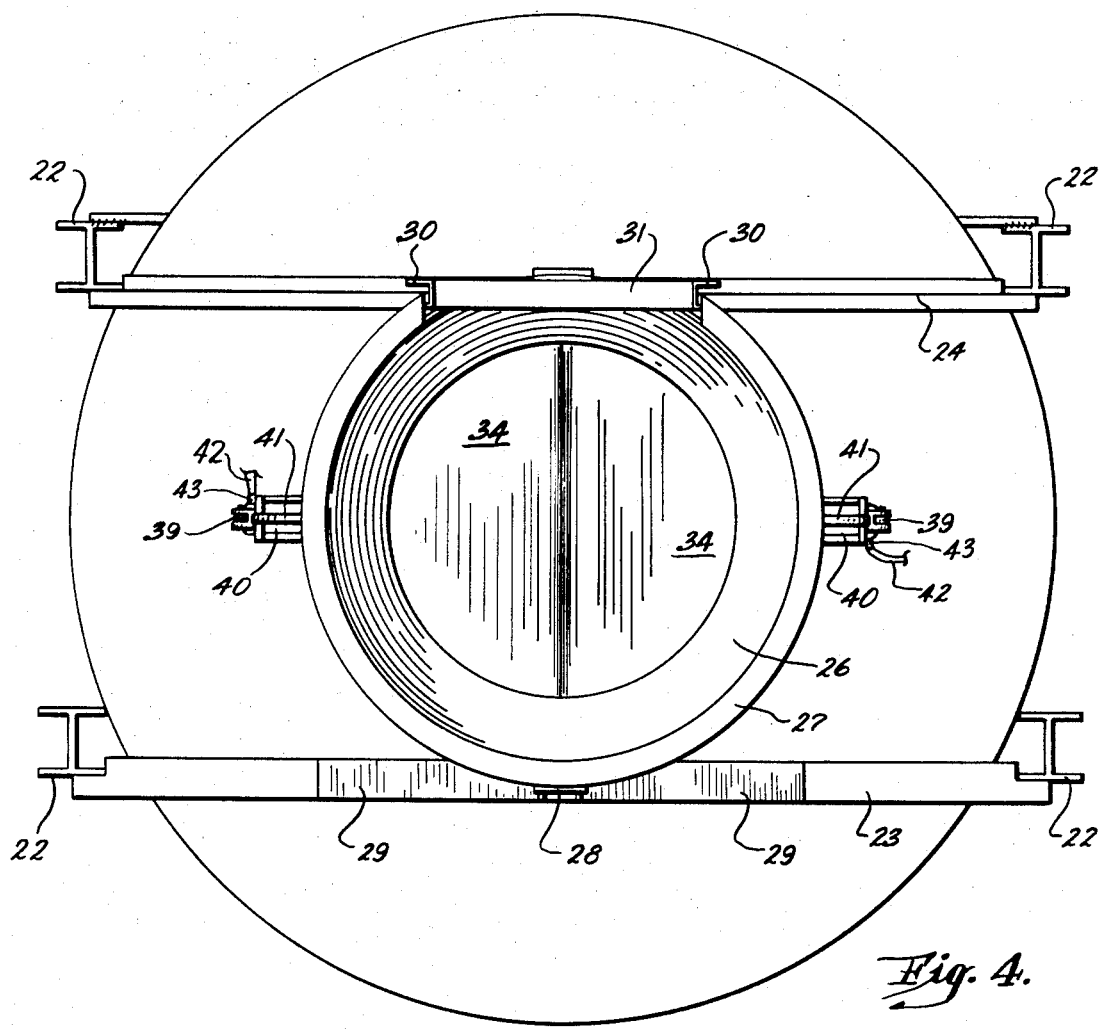
Fig. 4.
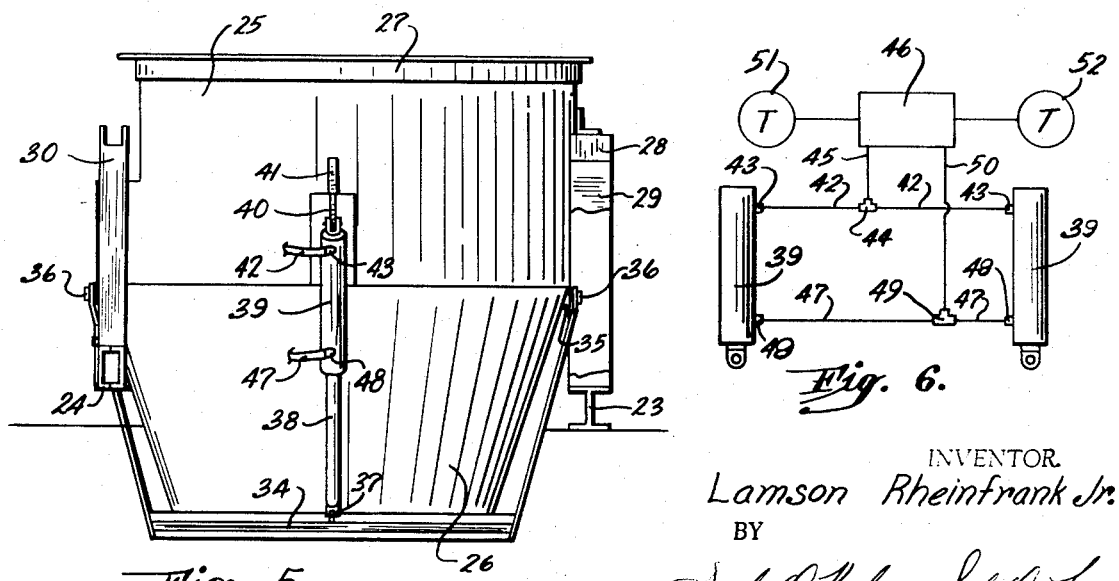
Fig. 5.
Fig. 6.
INVENTOR.
Lamson Rheinfrank Jr.
BY
Scofield, Hanson, Scofield & Lowe
ATTORNEYS.

3,777,909

APPARATUS FOR LOADING HOTMIX IN A SURGE BIN

BACKGROUND OF THE INVENTION

Many advances and improvements in the art of materials handling have directly contributed to increased production with decreased production costs. An aspect of this field to which this invention particularly relates is that of handling paving material, known in the trade as hotmix. The term "hotmix" broadly includes various grades of hot asphalt mixed with varying quantities of crushed rock, commonly known as aggregates. The aggregates vary from "fine" mixes of approximately one-half inch size to "coarse" mixes of approximately 1½ inch size.

In the past, one of the bottlenecks in paving construction had been trucking the hotmix from the hotmix plant to the job site. In order to decrease the trucking expenses and also the waiting time of a truck at the hotmix plant, temporary storage and loading facilities for hotmix plants have been developed.

Typical loading equipment to which this invention relates includes a conveyor apparatus which continuously receives hotmix from the plant and delivers it to a temporary storage or surge bin. Generally, this bin has an upper portion and a lower cone-shaped portion with a central discharge opening. The surge bin is supported on stilt legs which provide a "drive through" in which trucks can be positioned under the discharge opening to receive a load of hotmix.

This type of temporary storage operation has been successfully used to reduce truck waiting time since a full truck load of hotmix is available when a truck arrives from the job site. In addition, by smoothing out loading times and enabling the orderly delivery of hotmix from the plant to the job site, fewer trucks are required for paving construction.

The maximum time that hotmix is held in the surge bin is 12 hours, but in normal operation, the hold-up time is less than 2 to 3 hours. Therefore, the bin is not generally considered a storage device per se, but it may be adapted for such uses by installing insulation and heating equipment to prevent cooling and subsequent hardening of the hotmix.

Although this operation has many advantages, there is a problem which has developed from its use. The conveyor system used to continuously supply hotmix from the plant to the surge bin typically discharges the material into the center of the surge bin. As the bin continues to fill in this manner, the hotmix forms a cone-shaped pile and the coarse aggregates tend to separate from the asphalt and move outwardly to the base of the pile along the periphery of the bin. This phenomena is commonly termed segregation and results in an uneven distribution of aggregates in the hotmix.

SUMMARY OF THE INVENTION

The primary object of this invention is to provide a method and apparatus to substantially reduce segregation of the aggregates when hotmix is discharged into a surge bin. To accomplish this, hotmix is continuously fed to the upper end of the bin but is intermittently interrupted from free fall toward the bottom of the bin in pulses. Therefore, most simply stated, this invention transforms the normally continuous loading operation into a pulse-type operation which prevents segregation of the aggregates within the surge bin.

Another object of the invention is to provide an apparatus which can be activated to pulsingly discharge hotmix to a surge bin by a variety of control means. When equipped with standard manual or automatic control means, the apparatus may be activated on the basis of total weight of the hotmix, total volume of the hotmix, or preselected time intervals.

Another object of the invention is to provide an apparatus of the character described which can be easily installed on either permanent or portable surge bins.

Another object of the invention is to provide an apparatus of the character described which is rugged in construction and extremely dependable in operation, functioning virtually trouble-free while still handling a material which is characteristically troublesome.

Other and further objects of the invention, together with the features of novelty appurtenant thereto, will appear in the course of the following description.

DESCRIPTION OF THE DRAWINGS

In the accompanying drawings, which form a part of the instant specification and are to be read in conjunction therewith, and in which like reference numerals are used to indicate like parts in the various views:

FIG. 1 is a generally schematic view of a surge bin, continuous conveyor and pulse feeder constructed according to and for carrying out the method of the invention;

FIG. 2 is an enlarged side elevational view of the pulse feeder and fragmentary portions of the supports therefor with the clam gates shown in an opened position;

FIG. 3 is a side elevational view of the side of the feeder which receives the continuous conveyor;

FIG. 4 is a plan view of the feeder mounted on the surge bin;

FIG. 5 is a side elevational view along line 5—5 of FIG. 3 in the direction of the arrows; and FIG. 6 is a schematic diagram of the pneumatic system used to activate the clam gates.

Referring to the drawings in more detail, FIG. 1 illustrates the surge bin, continuous conveyor and pulse feeder in the normal operating relationship at a hotmix plant. The feeder, generally designated numeral 10, surmounts a surge bin, generally designated numeral 11, and is continuously fed by an inclined conveyor 12, only the upper portion of which is shown. The lower end of the conveyor 12 (not shown) receives hotmix from the plant and transports the material to the upper end where it is continuously discharged from a dumping spout 13. Such a conveyor particularly useful in the instant invention is described in my copending application "Inclined Drag Conveyor for Hot Asphalt Mix and the Like," Ser. No. 846,344, filed July 31, 1969.

The surge bin 11 includes an upper cylindrical portion 14 terminating at its lower end with a frusto-conical portion 15 which has a central opening 16 at the bottom from which hotmix can be discharged to loading trucks. The surge bin 11 is supported above the ground 17 by a plurality of stilt legs 18 which form a "drive through" 19 in which trucks or similar receiving equipment can be positioned. The legs 18 are interconnected by horizontal members 20 at the upper ends thereof. Also attached to the upper ends of the legs 18 are bin support members 21, attached in turn to vertical members 22 which extend throughout the entire height of the cylindrical portion 14 to provide additional support and rigidity.

At the upper end of the vertical members 22 are connected horizontal members 23 and 24 which are transversely disposed across the top of the cylindrical portion 14 of the surge bin 11, as viewed in FIG. 4. These members 23 and 24 provide the basic supporting structure for the feeder 10 now to be described in detail.

Although much smaller in size, the feeder 10 is structurally similar to the surge bin 11 itself. The feeder 10 includes an open topped, upper cylindrical portion 25 surmounting a lower frusto-conical portion 26 which terminates in a discharge opening. Affixed to the upper edge of the cylindrical portion 25 is a flange-type lip 27 which can be fitted with a rain cover (not shown) during inclement weather.

As viewed in FIGS. 2 and 4, the feeder 10 is concentrically disposed at the upper end of the surge bin 11 and is supported on one side by an upright member 28 attached to the horizontal member 23. Sloped bracing members 29 interconnect members 23 and 28 to provide additional support for the vertical member 23.

On the opposite side of the feeder 10 (FIG. 3), a pair of upright members 30 extend from the horizontal member 24 adjacent the side wall of the cylindrical portion 14. Near the upper ends of the upright members 30 is attached a horizontal, conveyor supporting rail 31 which is disposed near the bottom of an opening 32 in the cylindrical portion 14. A stub support 33 is also attached to the horizontal member 24 and the lower edge of the cylindrical portion 14 to support the feeder 10.

At the lower end of the feeder 10 is a pair of clam shell gates 34. Each gate 34 is pivotally suspended near the upper edge of the conical portion 15 on opposite sides thereof by bosses 35 which receive pivot bolts 36.

At the outer, lower edge of each gate is a centrally attached bracket 37 which is pivotally connected to the piston rod 38 of the pneumatic cylinder 39. The upper end of the pneumatic cylinder 39 is pivotally connected to a bracket assembly 40 rigidly affixed to the side wall of the cylindrical portion 14.

Above each bracket assembly 40, a hoisting connection 41 is rigidly attached to facilitate installation or removal of the feeder 10.

With the piston rods 38 of the pneumatic cylinders 39 fully extended, the gates 34 mate to provide a closure for the discharge opening of the frusto-conical portion 15 as viewed in FIG. 3. When the piston rods 38 are retracted into the pneumatic cylinders 39, the gates are pivotally pulled apart and material contained in the cylindrical and conical portions 14 and 15 falls through the discharge opening as viewed in FIG. 2. In this connection, I find it beneficial to construct the conical portion 15 using a slope of approximately 70° to insure all material will be discharged easily. It is also helpful to provide a quick-acting pneumatic (or hydraulic) system for the cylinders 38 as rapid action of the gates assists in achieving the objects of the invention. Likewise, mated gear teeth 34a at the upper ends of the gates 34, as viewed in FIG. 2, insure failsafe operation in the event of failure of either cylinder 39.

FIG. 6 illustrates a typical pneumatic control system for connecting the cylinders 39 in parallel to achieve the previously mentioned function. Extension lines 42 are connected to fittings 43 of each cylinder 39 and are also connected via a T-fitting 44 to a line 45 from a pneumatic controller 46. Likewise, retraction lines 47 are connected to fittings 48 of each cylinder 38 and are also connected via a T-fitting 49 to a line 50 from the hydraulic controller 46. Two adjustable automatic timers 51 and 52 connected to the controller 46 provide the signals to activate the opening and closing cycle of the clam gates 34 as well as the hold time.

In operation, the pulse feeder constructed in accordance with the principals previously described, is utilized in the following manner.

The feeder 10 surmounts the surge bin 11 as viewed in FIG. 1. The continuous conveyor 12 is oriented to permit the upper end to engage the supporting rail 31 with the dumping spout 13 as directed into the center of the feeder 10. The lower end of the conveyor 12 is positioned in the hotmix plant to continuously receive hotmix therefrom.

As the conveyor 12 continuously discharges hotmix into the feeder 10, the clam gates 34 are closed with the piston rods 38 extended from the pneumatic cylinders 39. When a sufficient amount of hotmix is delivered to the feeder 10, the pneumatic cylinders 39 are activated to retract the piston rods 38, thus opening the clam gates 34 and discharging the entire load of hotmix into the surge bin 11. Once the hotmix is discharged, the pneumatic cylinders 39 are again activated to extend the piston rods 38 and close the clam gates 34.

There are a variety of control systems available to determine the opening and closing cycle of the clam gates. Such control systems include operating on predetermined time intervals, operating by the total weight of the load received by the feeder, or the total volume of hotmix received by the feeder. Since the conveyor provides a substantially steady state flow of hotmix, I have found that an automatic control system which opens the gates at preselected time intervals is satisfactory for use in conjunction with this invention.

With this invention, a loading operation which was previously continuous has been transformed into pulse-type loading. By discharging a relatively large amount of hotmix to the surge bin at one time, the problem of segregation is simply no longer a problem.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

Since many possible embodiments may be made of the invention without departing from the scope thereof, it is to be understood that all matter herein set forth or shown in the accompanying drawings is to be interpreted as illustrative and not in a limiting sense.

Having thus described my invention I claim:

1. In combination with a continuous conveyor and a surge bin,
   an open topped container surmounting said surge bin and concentrically aligned therewith, said container being of relatively smaller size than said surge bin and including an upper cylindrical portion and a frusto-conical portion constructed with a slope in the range of 60° to 80° and having a discharge opening at the lower end thereof;
   movable closure means associated with said container and operable to close said discharge opening, said closure means including a pair of clam gates, each of said gates pivotally supported at opposite sides of said container;

pneumatic cylinder means connected to said clam gates to intermittently move said gates and thereby open and close said discharge opening; and a supporting rail attached to the upper cylindrical portion of said container and operable to support the end of said continuous conveyor.

* * * * *